United States Patent [19]

Ohmi et al.

[11] Patent Number: 5,362,461
[45] Date of Patent: Nov. 8, 1994

[54] METHOD FOR RECOVERING CALCIUM FLUORIDE FROM FLUOROETCHANT

[75] Inventors: Tadahiro Ohmi, Miyagi; Hiroyuki Harada, Tokyo; Nobuhiro Miki; Toshiro Fukutome, both of Osaka; Matagoro Maeno, Izumi; Norio Terasawa, Tokyo; Yoshihiro Eto, Kanagawa; Masahiro Sakata, Tokyo, all of Japan

[73] Assignee: Kurita Water Industries, Ltd., Tokyo, Japan

[21] Appl. No.: 953,960

[22] Filed: Oct. 1, 1992

[30] Foreign Application Priority Data

Oct. 3, 1991 [JP] Japan .................................. 283747
Mar. 13, 1992 [JP] Japan .................................. 89775
May 12, 1992 [JP] Japan .................................. 146278

[51] Int. Cl.$^5$ ........................................ C01F 11/22
[52] U.S. Cl. ................................. 423/163; 423/490
[58] Field of Search ............................ 423/163, 490

[56] References Cited

U.S. PATENT DOCUMENTS

| 4,093,706 | 6/1978 | Augustyn et al. | 423/490 |
| 4,098,873 | 7/1978 | Hollingsworth | 423/490 |
| 4,120,940 | 10/1978 | Warneke | 423/490 |

FOREIGN PATENT DOCUMENTS

| 110498 | 9/1976 | Japan | 423/490 |
| 46355 | 10/1983 | Japan | 423/490 |

*Primary Examiner*—Wayne Langel
*Attorney, Agent, or Firm*—Armstrong, Westerman, Hattori, McLelland & Naughton

[57] ABSTRACT

Calcium fluoride with high purity of very small content of unreacted calcium carbonate and silica is recovered from an etchant mainly composed of hydrogen fluoride or hydrogen fluoride and ammonium fluoride. The etchant is reacted with calcium carbonate with transfer directions of the etchant and calcium carbonate being controlled within a composition region in which mole equivalent ratio of ammonium fluoride/hydrogen fluoride is specified.

12 Claims, 13 Drawing Sheets

Equivalent Addition of
CaCO₃ /F amount in solution

Fig. 7  HTS (1)

Fig. 8 HTS(2)

Fig. 9      B T S (1)

METHOD FOR RECOVERING CALCIUM FLUORIDE FROM FLUOROETCHANT

BACKGROUND OF THE INVENTION

1. Industrial Field

Etchants mainly composed of hydrogen fluoride alone or mixture of hydrogen fluoride and ammonium fluoride and containing additives for accelerating various chemical reactions have been commonly used not only for etching in the field of semiconductor production and other fields related thereto but also in the field of surface treatment of various materials such as metallic material, monocrystal material, optical material, etc. With increasing demand for the etchant, the importance of recovery techniques therefor has also increased a great deal in view of the need for environmental protection, particularly from the viewpoint of recycling.

In view of the foregoing, a primary object of the present invention is to establish a method for recovering fluorine from the used etchant in the form of purified calcium fluoride so that the recovered calcium fluoride may be effectively utilized again as a useful industrial resource in the field of production of hydrogen fluoride, refinement of metals, ceramic industry, etc.

2. Prior Art

Hitherto, a large number of techniques have been developed and proposed for treating a waste water containing fluorine with the use of calcium salt.

However, the reaction mechanism in the treatment of a solution containing ammonium fluoride utilizing the calcium salt has not been sufficiently studied in detail yet and, accordingly, there still remain several problems unsolved.

Looking briefly at past developments in the treatment of waste water containing fluorine, Japanese Laid-Open Patent Publication (unexamined) No. 51-19364 disclosed a technique for treating a waste water left after cleaning a stainless surface with hydrofluoric acid; Japanese Patent Publications (examined) Nos. 56-10120/57-39985/59-8438 disclosed a technique for eliminating fluorine and phosphorus from a waste water used in the process with phosphoric acid; and Japanese Patent Publications (examined) Nos. 56-144792/60-48191/61-25690/63-270595 disclosed a technique for treating a waste water left after semiconductor processing. In any of these prior arts, since it is intended to purify the waste water through the first and second treatments or separation of coexistant components or by combining separation steps, purification of calcium fluoride cannot be achieved.

U.S. Pat. Nos. 2,780,521 and 2,780,522 disclosed a technique in which calcium fluoride is produced with the use of calcium carbonate to separate silica contained in the filtrate for the purpose of recovering colloidal silica from the solution of fluorosilicic acid. By this technique, however, pure calcium fluoride recovery is limited to 92% $CaF_2$ and 0.52% $SiO_2$ per dry unit.

Japanese Laid-Open Patent Publication (unexamined) No. 50-142496 disclosed a method for adding calcium carbonate in two stages as a technique for purifying a waste water left after the process with wet phosphoric acid, and in which method excessive calcium carbonate was eliminated by cleaning with mineral acid.

Japanese Patent Publication (examined) No.57-47132 disclosed a technique for treating an exhaust gas containing fluorine comprising the steps of absorbing the exhaust gas in caustic potash; reacting potassium fluoride produced thereby by adding 1.0±0.2 equivalent of potassium hydroxide; separating a precipitation layer mainly composed of calcium fluoride from a solution layer mainly composed of potassium hydroxide; neutralizing unreacted alkali such as $Ca(OH)_2$, KOH by adding an acid to the precipitation layer. In this technique, the reactivity of KF is 90% when 1.0 equivalent is added. Since there remains a lot of unreacted substances, neutralization with the use of hydrochloric acid is required, and moreover since concentration of residual fluorine ion is so high as to be 900 ppm, the concentration is reduced to 200 ppm by adding excessive equivalent of 1.2 equivalent.

Japanese Laid-Open Patent Publication (unexamined) No. 58-46355 disclosed a method of adding slaked lime in two stages as a technique for treating waste liquid containing ammonium fluoride. This method comprises a first stage of precipitating a high grade calcium fluoride for separation by adding slaked lime to fluorine in such a manner that the added amount of the former is a little smaller than that of the latter; and a second stage of precipitating a low grade calcium fluoride for separation by adding 2 equivalents of slaked lime to the residual fluorine; then returning the obtained low grade calcium fluoride to the first step, while distilling the residual solution to recover ammonia.

The mentioned method of adding slaked lime is not always appropriate for the solution containing hydrogen fluoride alone or a mixture of hydrogen fluoride and ammonium fluoride to be treated in the present invention. This is because fluorosilicic acid ion present in the etchant reacts with the slaked lime, whereby most of the silica is combined with the calcium fluoride obtained eventually, resulting in inhibition of high purification.

As mentioned so far, the prior art cannot solve the problems or meet the object of the invention in the manner described below.

SUMMARY OF THE INVENTION

It is an object of the present invention to recover pure calcium fluoride from an etchant mainly composed of hydrogen fluoride with the use of calcium carbonate, and in which one of the problems to be solved is to minimize the content of unreacted calcium carbonate and another is to minimize the content of silica produced by the reaction between fluorosilicic acid generally introduced by the etching process and the calcium carbonate. The mentioned problems to be solved have respectively following further derivative problems.

Composition of Etchant to be Treated

In semiconductor manufacturing which is one of the important fields of application for an etchant composed of hydrogen fluoride and/or ammonium fluoride, for example, etchant compositions are used which contain 50% HF and 40% $NH_4F$ as a starting undiluted solution. FIG. 1 shows several examples of the representative compositions marked ●. There are compositions ranging from about 0.5% in concentration of hydrogen fluoride to 40% in that of ammonium fluoride, and the mole equivalent ratio of ammonium fluoride/hydrogen fluoride in various etchants ranges from 0 to infinity. Accordingly, there are various chemical species of fluorine such as undissociated HF, $F^-$ ion, $HF_2^-$ ion, and the reaction mechanism with calcium carbonate is not uniform. No study has taken place until today with respect to the existence of any composition for optimizing the reactivity of calcium carbonate, such composition being first disclosed in the present invention.

Described hereunder is a resource value in the form of raw material for producing hydrogen fluoride which is one of the most popular uses when recovered calcium fluoride contains some unreacted calcium carbonate. In this respect, while undergoing reaction 1 (Chemical equation 1) according to which hydrogen fluoride is produced by heating calcium fluoride and sulfuric acid, the coexistent calcium carbonate causes a following reaction 2 (Chemical equation 2) to proceed. In these chemical equations, the values in parenthesis indicate the ratios of the amounts of materials.

Chemical equation 1:
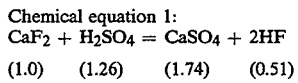
$CaF_2 + H_2SO_4 = CaSO_4 + 2HF$
(1.0)   (1.26)   (1.74)   (0.51)

Chemical equation 2:
$CaCO_3 + H_2SO_4 = CaSO_4 + H_2O + CO_2$
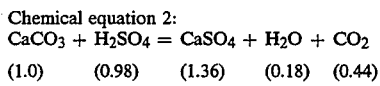
(1.0)   (0.98)   (1.36)   (0.18)   (0.44)

More specifically, calcium carbonate consumes sulfuric acid thereby causing hydrogen fluoride gas to contain H O and CO gas, and in such process various physical quantities and heating values are consumed. Supposing that 1.0% calcium carbonate is contained in calcium fluoride, economic lost amounts to about in 3% in terms of pure calcium fluoride. Consequently, how to optimize the reactivity of calcium carbonate is a significant economic concern not only from the viewpoint of recovery but also that of recycling.

A Fluoroetchant Acid in Etchant

Fluoroetchant is particularly superior in its reactivity with silicon compounds and therefore has been popularly used for etching and/or cleaning of monocrystal silicon, silicon semiconductor devices and other articles containing quartz, glass and other silicon materials, and in which fluorosilicic acid exists in the etchant in most cases. During the reaction between fluorine ion and calcium salt in the etchant, it is generally known that silica comes to deposit from fluorosilicic acid ion according to the following reaction 3 (Chemical equation 3):

(Chemical equation 3)

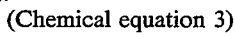
$2H^+ + SiF_6^{-2} + 3Ca(OH)_2 = 3CaF_2 + Si(OH)_4 + 2H_2O$

Described hereunder is a resource value of recovered calcium fluoride containing silica when it is utilized as a material for producing hydrogen fluoride. Silica and calcium fluoride undergo an endothermic reaction with sulfuric acid, and fluorosilicic acid is produced by the following reaction 4 (Chemical equation 4):

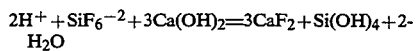
$SiO_2 + 3CaF_2 + 3H_2SO_4 = H_2SiF_6 + 3CaSO_4 + 2H_2O$
(1.0)   (3.9)   (4.9)   (2.4)   (6.8)

In the above formula, the values in parentheses indicate the ratio of the amounts of materials.

For example, when 1.0% silica is contained in calcium fluoride, 3.9% $CaF_2$, 4.9% $H_2SO_4$ and heat are consumed, and furthermore a process for eliminating by-produced 2.4% $H_2SiF_6$ and consumption of raw materials are required, eventually resulting in about 10 to 15% of economic loss in terms of pure calcium fluoride. Consequently, minimization of silica content in the recovered calcium fluoride contributes significantly to the recycling value of the recovered calcium fluoride.

The relation between the composition of the etchant mainly composed of hydrogen fluoride and ammonium fluoride and the reactivity thereof with calcium carbonate has not been heretofore clearly ascertained. FIG. 1 shows an entire composition region in terms of molar concentration of ammonium fluoride/molar concentration of hydrogen fluoride (indicated by $NH_4F/HF$), from which chemical reactions 5 to 9 (Chemical equations 5 to 9) of three representative compositions are shown as follows:

Two components $HF$—$H_2O$: $NH_4F/HF=0$
(Chemical equation 5)

$HF + CaCO_3 = CaF_2 + CO_2 + H_2O$

Three components $HF$—$NH_4F$—$H_2O$: $NH_4F/HF=1$
(Chemical equation 6)

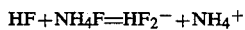
$HF + NH_4F = HF_2^- + NH_4^+$ (Chemical reaction 7)

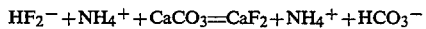
$HF_2^- + NH_4^+ + CaCO_3 = CaF_2 + NH_4^+ + HCO_3^-$

Two components $NH_4F$—$H_2O$: $NH_4F/NH=\infty$
(Chemical equation 8)

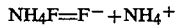
$NH_4F = F^- + NH_4^+$ (Chemical equation 9 )

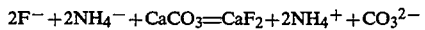
$2F^- + 2NH_4^+ + CaCO_3 = CaF_2 + 2NH_4^+ + CO_3^{2-}$

In the respective compositions shown above, the ion species of the original type reaction is different from that of the production process, and therefore it is predicted that the reaction will proceed at its own reaction rates and reaction equilibrium constant. The inventors conducted reaction tests in every composition region, i.e., every ratio of $NH_4F/HF$ and every concentration. FIG. 2 shows the data obtained under the conditions described below.

A chemical equivalent of calcium carbonate was added to fluorine in a treatment solution, and the reaction temperature was not lower than 70° C. As a result, it was ascertained that a reaction percentage of not less than 97% of the treatment solution was achieved over the entire HF concentration range of 1.0 to 10.0% in the case of a composition range in which the ratio of $NH_4F/HF$ was not more than 1.0 (except that $NH_4F/HF=0$, i.e., HF solution without $NH_4F$). In the case of singular HF solution, the recovery percentage of fluorine was 94% when treated with granular calcium carbonate for 9 hours at normal temperature. On the other hand, in case of powdered calcium carbonate, the recovery percentage of fluorine after the treatment for 3 hours amounted to 99%. FIG. 3 shows the result. When an ammonium salt is present the efficiency of defluorination is reduced by the action of heating and calcium carbonate unless ammonia is eliminated. FIG. 4 shows the effect of temperature on the reactivity. From FIG. 4, it is obvious that the treatment may be effectively carried out at the solution temperature of not lower than 50° C., preferably not lower than 70° C. In this connection, the symbols in FIG. 4 respectively indicate the following. In addition, 1.0 equivalent of pure $CaCO_3$ component was added to the entire HF in the solution and kept for one hour at respective temperatures.

| Symbol | $NH_4F/HF$ | Entire HF % |
|--------|------------|-------------|
| A: | 0.5 | 2.0 |
| B: | 0.5 | 10.0 |
| C: | 0.83 | 2.0 |
| D: | 0.83 | 10.0 |

FIG. 5 shows the result of research on the two components hydrogen fluoride and fluorosilicic acid.

It was observed that, even if HF and $H_2SiF_6$ of equal F concentration were present, when they were treated with calcium carbonate at room temperature, $SiO_2$ of initial concentration still remained in the solution in which the entirety fluorine was separated in the form of $CaF_2$. This clearly shows purification as a result of using calcium carbonate.

FIG. 6 shows the results of research on the change in $SiO_2$ concentration on the entire region of the three components $HF-NH_4F-H_2O$. The total HF concentration in the treatment solution was 1.0% to 2.0%, and the $SiO_2$ concentration was 200 ppm to 400 ppm. At the solution temperature of 70° C., a chemical equivalent of calcium carbonate was added and calcium fluoride produced thereby was separated from the solution from which $SiO_2$ was eliminated. This elimination percentage of $SiO_2$ with respect to F concentration is shown in FIG. 6. It was observed that productivity as a result of adding the calcium carbonate was not dependent upon the variation of the $NH_4F/HF$ ratio at all even when there was any change in the ratio. FIG. 6 also shows comparatively that when using calcium hydroxide instead of calcium carbonate under the same treatment conditions, most of the $SiO_2$ was contained in the calcium fluoride, and the elimination percentage of $SiO_2$ reached a very large value.

The process of using an etchant of hydrogen fluoride and/or ammonium fluoride as well as concentration thereof are not uniform but variable depending upon the industrial field, and such variation will be necessary in practical use. It is, however, to be noted that such variation does not depart from the composition range shown in FIG. 1. Recovery of highly pure calcium fluoride is achieved with the use of calcium carbonate in this composition range only.

Generally in manufacturing semiconductors, there are both a two component etching step with $HF-H_2O$ and a three component etching step with $HF-NH_4F-H_2O$, in which the $NH_4F/HF$ ratio is usually not more than 1 as a whole. The invention is applicable to this industrial field by integrating the recovery system. As for the other industries, the invention is applicable not only to the field wherein the $NH_4F/HF$ ratio is not more than 1.0 but also in the field wherein two component treatment of $HF-H_2O$ is required.

A method for recovering fluorine in the form of calcium fluoride from an etchant mainly composed of hydrogen fluoride or hydrogen fluoride and ammonium fluoride according to the invention comprises the steps of adding an approximate equivalent of calcium carbonate to an etchant for a reaction therebetween to proceed; recovering fluorine at a percentage of not less than 99% from a drain; and recovering a highly pure calcium fluoride in which the content of unreacted calcium carbonate is not more than 1% and the content of silica is small.

In order to accomplish that "not less than 99% of fluorine is recovered and, at the same time, unreacted calcium carbonate among the recovered calcium fluoride is not more than 1%", it is definitely an essential requirement that "a chemical equivalent of calcium carbonate is added to fluorine so that reactivity is approximately 100%".

It is certain that recovery of fluorine is achieved by adding an excess of calcium carbonate even if the reactivity does not reach approximately 100%, which has been one of the prior drainage techniques. However, since the recovered calcium fluoride contains residual calcium carbonate, the object of recovery with high purity is not achieved. Moreover, addition of a chemical equivalent in which reactivity does not reach approximately 100% certainly results in lowering of recovery percentage and purity obtained by such recovery. Accordingly, without development of an improved recovery technique for achieving the reactivity percentage of almost 100% by addition of chemical equivalent, it is not possible to achieve the recovery percentage of 99% of highly pure calcium fluoride.

As means for achieving the reactivity percentage of approximate 100% by addition of chemical equivalent, the inventors have proposed a technique in which the transfer direction of etchant and calcium carbonate is forced to be counterflow. By using this technique, both high purification of recovered calcium fluoride and minimization of fluorine content in the drainage was achieved. In such a technique, it is a matter of course that increase in the capacity of treating the solution results in necessity of large-scale equipment. The inventors have been engaged in researches of means for restraining such expansion of equipment scale while improving the effect of counterflow. And as a result of this, the inventors have come to propose a following combined system; (1) combination of parallel flow and counterflow, (2) two-stage addition of grain calcium carbonate and powdered calcium carbonate, and (3) combination of hydrogen fluoride group and hydrogen fluoride and ammonium fluoride group. Described hereinafter is a basic mechanism or principle and features of this system.

In the first place, the ratio of solid phase/liquid phase in the treatment system is an important factor. Generally an etchant of hydrogen fluoride is used at a concentration of 0.5% and diluted to about 1/10 in the cleaning step, and therefore the ratio of recovered calcium fluoride/treatment amount of solution is about 1/1000. As for an etchant of hydrogen fluoride and ammonium fluoride, the HF concentration thereof after the cleaning step is 2 to 5%. and the ratio of recovered calcium fluoride/treatment amount of solution is about 4 to 10/100. Accordingly, it is possible to reduce the scale of the equipment for counterflow system in proportion to the ratio of solid phase/liquid phase as compared with the parallel flow system by employing the parallel flow for treating a large amount of liquid phase, i.e., recovery of fluorine in the solution, and employing the counterflow system for treating a small amount of solid phase, i.e., high purification of recovered calcium fluoride.

The grain size of recovered calcium fluoride is another important factor having a significant influence on recycling value. In the reaction between fluoroetchant and granular calcium carbonate, a reaction of solid phase production in solid phase takes place, in other words, it is clearly recognized that calcium carbonate is transformed into calcium fluoride without changing the shape of particles. It is to be noted that even when a recovered calcium fluoride is pure, its usefulness is remarkably reduced not only in the process of extraction, cleaning, drying, transportation, but also in the recycling process, so long as the recovered calcium fluoride is in powder form. For example, as to hydrogen fluoride generating material, there is no material as a substitute for natural fluoride.

In the parallel flow treatment of liquid phase, if the grain size of calcium carbonate is large, a relatively long time is needed for sufficiently lowering the concentration of fluorine in the solution and, therefore, the scale of treatment equipment has to be enlarged. To overcome this disadvantage, the inventors have arrived at the idea of shortening reaction time while allowing the grain size to be large as a while and the treatment equipment is small-sized, by adding most of the calcium carbonate in grain form to a reaction tank of a first stage and adding the remaining part in powder form to a reaction tank of a second stage for the necessary reactions.

The grain size of the granular calcium carbonate is preferably 0.05 to 0.15 mm but not limited thereto. Specific surface area of the powder calcium carbonate is preferably 1000 to 6000 $cm^2/g$ (30 to 3 $\mu m$ in grain size).

In the treatment of an etchant of hydrogen fluoride and ammonium fluoride, the necessary reaction does not take place without high temperature. That is, it takes a long time until the completion of reaction in the deepest part of calcium carbonate to be transformed to calcium fluoride, which also affects the scale of equipment. It was, however, recognized by the inventors that this problem of reaction of the deepest part was effectively solved by introducing the treatment system of etchant of hydrogen fluoride without waiting for the completion of reaction in the deepest part. More specifically, the improved method comprises the steps of: treating the etchant of hydrogen fluoride and ammonium fluoride and calcium carbonate equivalently with respect to the reacting calcium carbonate by the parallel flow treatment; completing the reaction of the liquid phase; and treating the solid phase containing unreacted calcium carbonate by the counterflow treatment together with the etchant of hydrogen fluoride. In the counterflow treatment, it is preferable to supply either a stirring tank or a fixed bed with the solid phase, i.e., calcium fluoride containing unreacted calcium carbonate. In either method, the counterflow system is employed in which an etchant of hydrogen fluoride is caused to join the parallel flow treatment of the first stage after transforming the unreacted calcium carbonate completely to calcium fluoride.

FIGS. 7 and 8 respectively show a method for treating a two component etchant of HF—$H_2O$. In the method shown in FIG. 7, hydrofluoric acid discharged out of the semiconductor process is once introduced in a storage tank, then reacted with granular calcium carbonate in the reaction tank R1 by the parallel flow, and further treated by adding powdered calcium carbonate in the reaction tank R2, whereby not less than 99% of fluorine is recovered. Drainage was discharged though a thickener, and calcium fluoride containing unreacted calcium carbonate is treated in the reaction tank R3 with the etchant of hydrogen fluoride and by the counterflow treatment, whereby a highly pure calcium fluoride of less silica content is obtained. FIG. 8 shows an example in which a tank of hydrofluoric acid is employed as a reaction tank.

FIGS. 9 and 10 respectively show a method for treating a three component etchant of HF—NH F—H O (buffered hydrogen fluoride).

In the method shown in FIG. 9, a buffered hydrogen fluoride is reacted with an almost equivalent of calcium carbonate at 70° C. in the reaction tank R1 by the parallel flow treatment system, thereby recovering not less than 99% of fluorine in the drain, and calcium fluoride containing unreacted calcium carbonate is transfered into the reaction tank R2 to be treated there with the etchant of hydrogen fluoride by the counterflow system, whereby a highly pure calcium fluoride of less silica content is produced. Drainage out of the tank R2 is transfered into the tank R3 to be treated together with the buffered hydrogen fluoride.

In the method shown in FIG. 10, an etchant of hydrogen fluoride is transformed to calcium fluoride of high purity by passing the etchant through the counterflow system with the use of a fixed bed filled with a certain amount of calcium fluoride containing unreacted calcium carbonate discharged out of the reaction tank R1 instead of the reaction tank R2 in FIG. 9. Calcium fluoride of high purity can be also recovered in the same treatment system as above from other etchant mainly composed of either hydrogen fluoride or hydrogen fluoride and ammonium fluoride and to which etching assistant not forming any insoluble calcium salt such as nitric acid, hydrochloric acid, acetic acid, hydrogen peroxide, surfactant is singly added or a mixture obtained by blending some of them is added.

The inventors have been also engaged in research on the reactivity with the passage of time under the treatment conditions of (1) high temperature treatment at 50° to 100° C., (2) aeration treatment by aeration at high temperature, and (3) deaeration treatment by reduced pressure at high temperature when an approximate chemical equivalent of calcium carbonate is added to the solution containing ammonium fluoride. FIG. 12 shows an example of the obtained result. It was observed from the research that for the purpose of lowering pH value and shortening the time required for reducing the concentration of residual fluorine, aeration and deaeration by reduced pressure were remarkably effective.

In this respect, FIG. 12 is a graphic diagram showing the conditions of temperature, aeration and deaeration in the approximate chemical equivalent reaction between a solution containing ammonium fluoride and calcium carbonate, and showing the relation between such conditions and rate in reducing the concentration of fluorine in the reacting solution, and in which reference numerals 1, 2 and 3 in the drawing respectively indicate the following:

1(mark ●): treatment by heating only;
2(mark ): treatment by aeration (3 liters/min, 1 liter of solution);
3(mark □): treatment by deaeration with reduced pressure (100 mmHg)

composition of the solution before the reaction is $NH_4F$: 15.35%, HF: 1.70%, and specific area of calcium carbonate is 200 $cm^2/g$ (0.05 to 0.15 mm).

A calcium recovery system is arranged by connecting an aeration device or aerator and a pressure reducing device capable of reducing pressure in the reaction tank and absorbing completely the discharged ammonia to a stirring reaction tank of external heating or internal heating type in which a solution containing ammonium fluoride reacts with calcium carbonate. It is preferable to use either aeration treatment or deaeration reduced pressure treatment or both of them in combination.

FIG. 13 shows an example of the system for combined use. For operation of the aeration treatment only, no pressure-proof construction is needed, while for operation of the reduced pressure deaeration treatment, a pressure-proof construction is needed although no aeration port is needed as a matter of course. Described hereunder is a system for combined use.

The reaction tank is formed into a sealed construction provided with a vapor supply port for internal heating, and has a sealed type calcium carbonate feeder such as rotary feeder.

The reaction tank is provided with an air supply port and an exhaust port, and the exhaust port is provided with a mist separator so that the vapor phase coming out of the reaction tank may be prevented from containing fluorine component.

The system shown in FIG. 13 is an example of pressure reducing device for complete absorption of ammonia comprising an ejector, an ammonia absorbing water tank, and a circulating pump.

This system is applicable for both batch supply or continuous supply of a chemical equivalent of calcium carbonate to the fluorine in the solution containing hydrogen fluoride and ammonium fluoride. In the case of application to continuous supply, it is preferable to increase the capacity of the reaction tank and extend the residence time so as to maintain the concentration of fluorine in the treatment solution to be not higher than the target value.

DESCRIPTION OF THE PREFERRED EMBODIMENT

Described hereinafter are specific examples of embodiments illustrating the advantages of the present invention.

EXAMPLE 1

Figure 1:
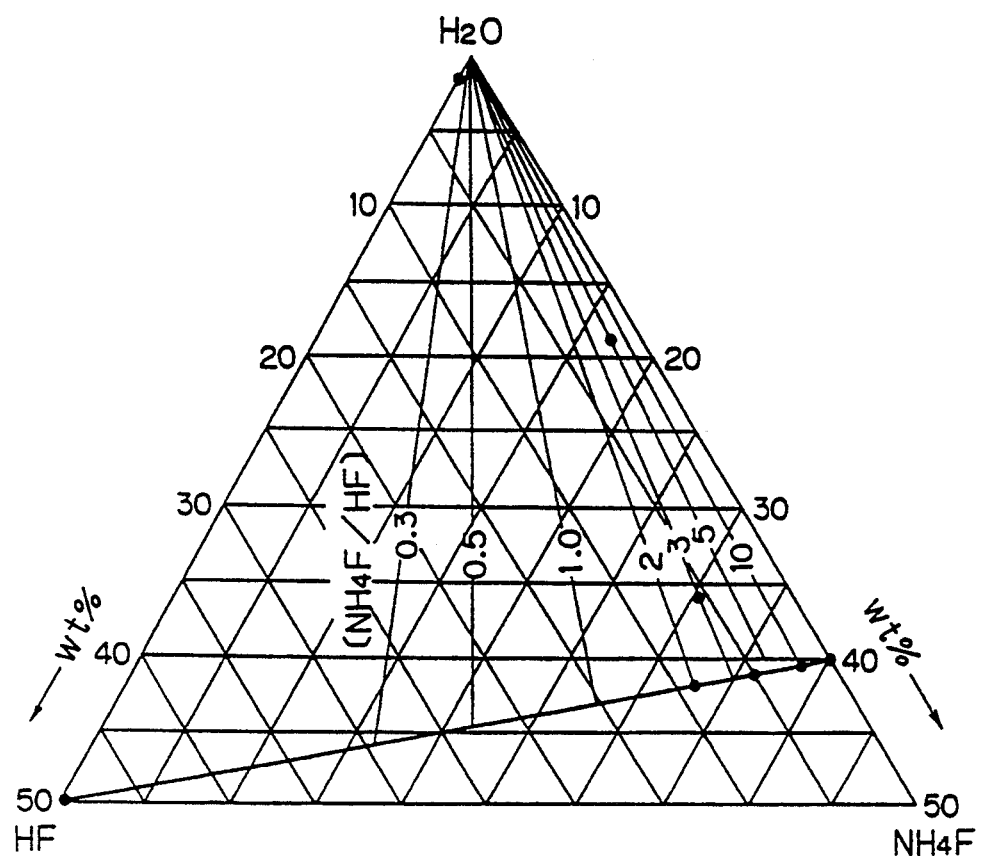
FIG. 1 is a composition diagram of the three element composition of hydrogen fluoride-ammonium fluoride-$H_2O$.
Figure 2:
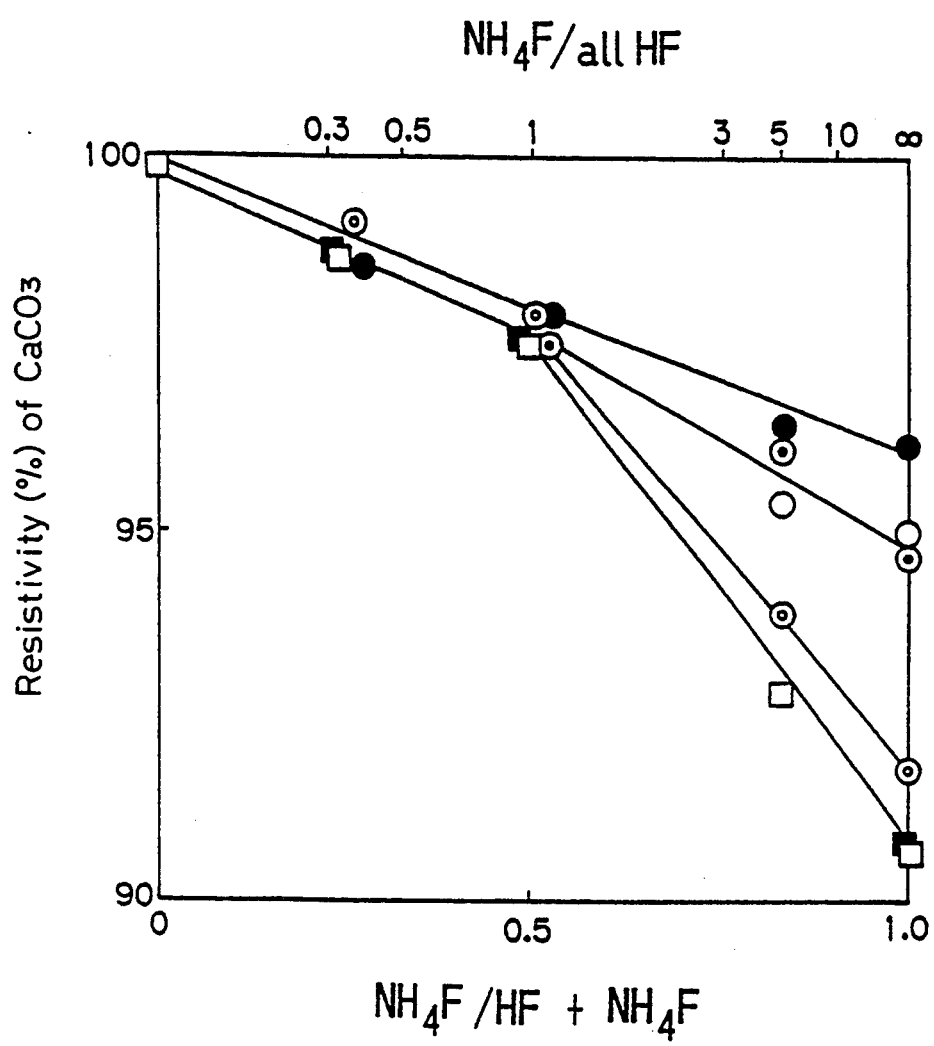
FIG. 2 is an explanatory diagram showing the reactivity of calcium carbonate in the composition region of hydrogen fluoride and ammonium fluoride.
Figure 3:
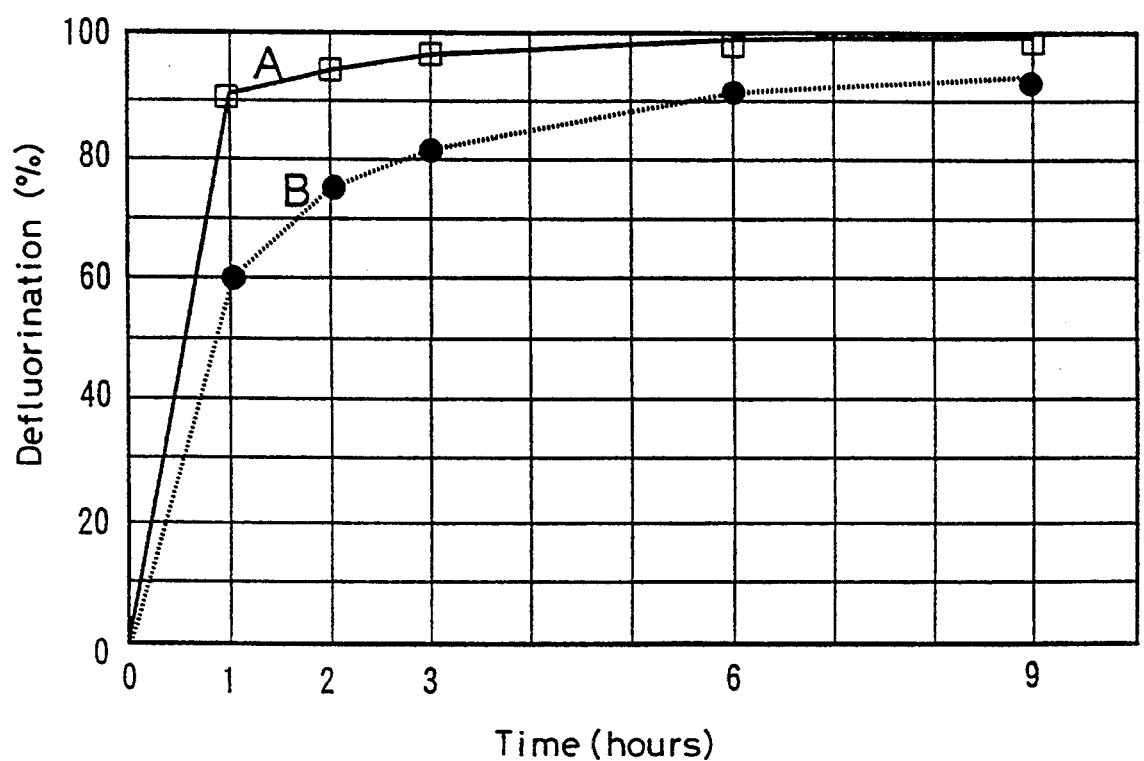
FIG. 3 is a graphic diagram showing the relation between type of calcium carbonate and fluorination percentage thereof.
Figure 4:
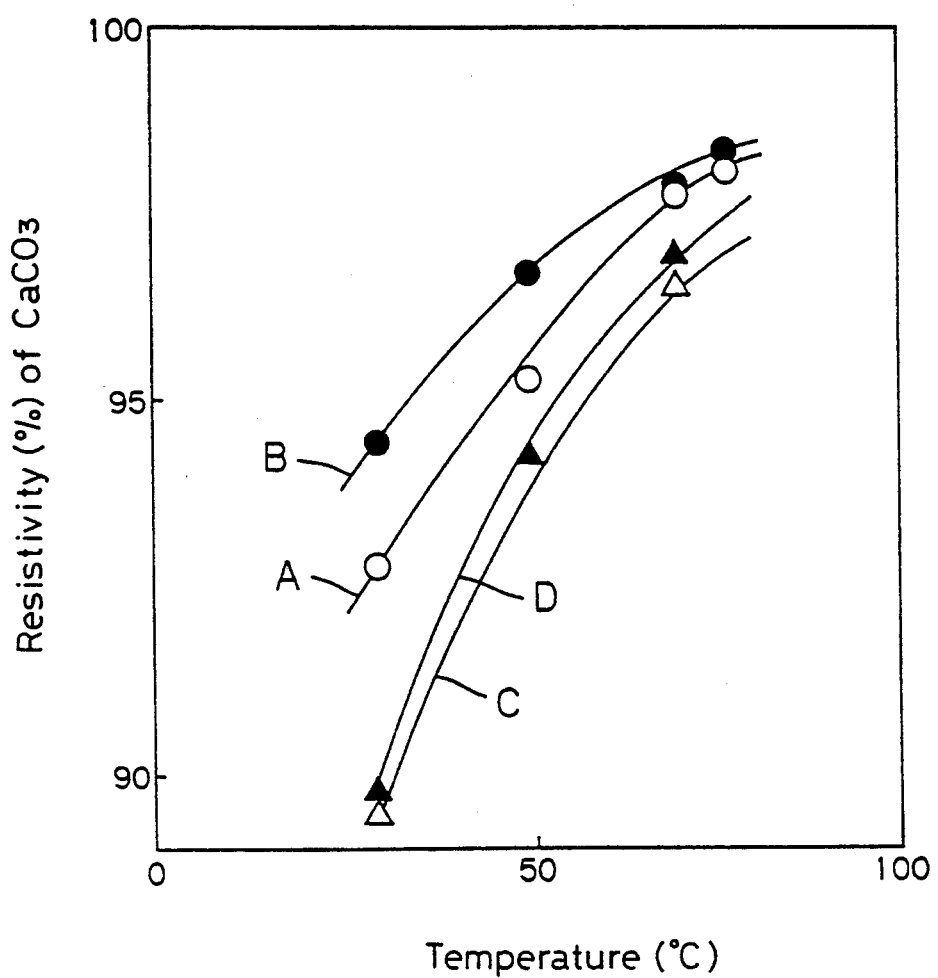
FIG. 4 is a graphic diagram showing the relation between reactivity and temperature.
Figure 5:
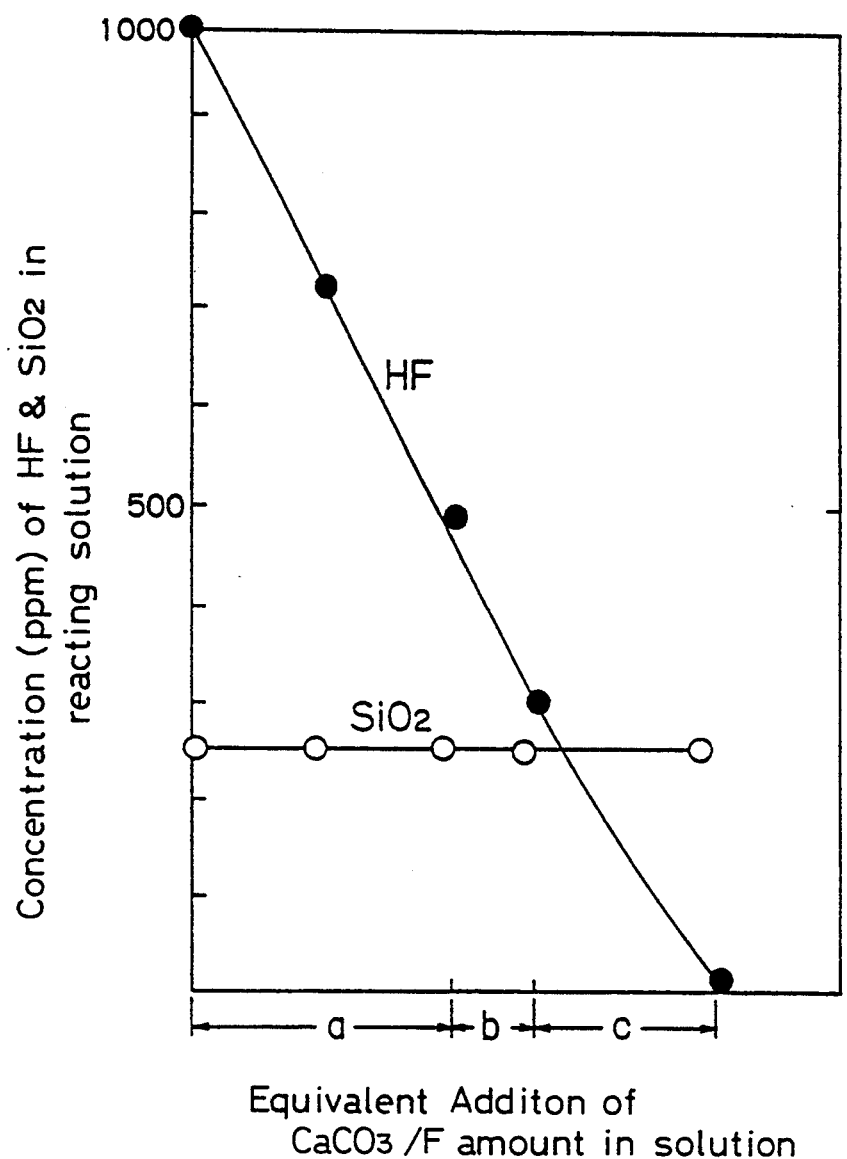
FIG. 5 is a composition diagram of mole composition region of hydrofluoric acid, fluorosilicic acid, etc.
Figure 6:
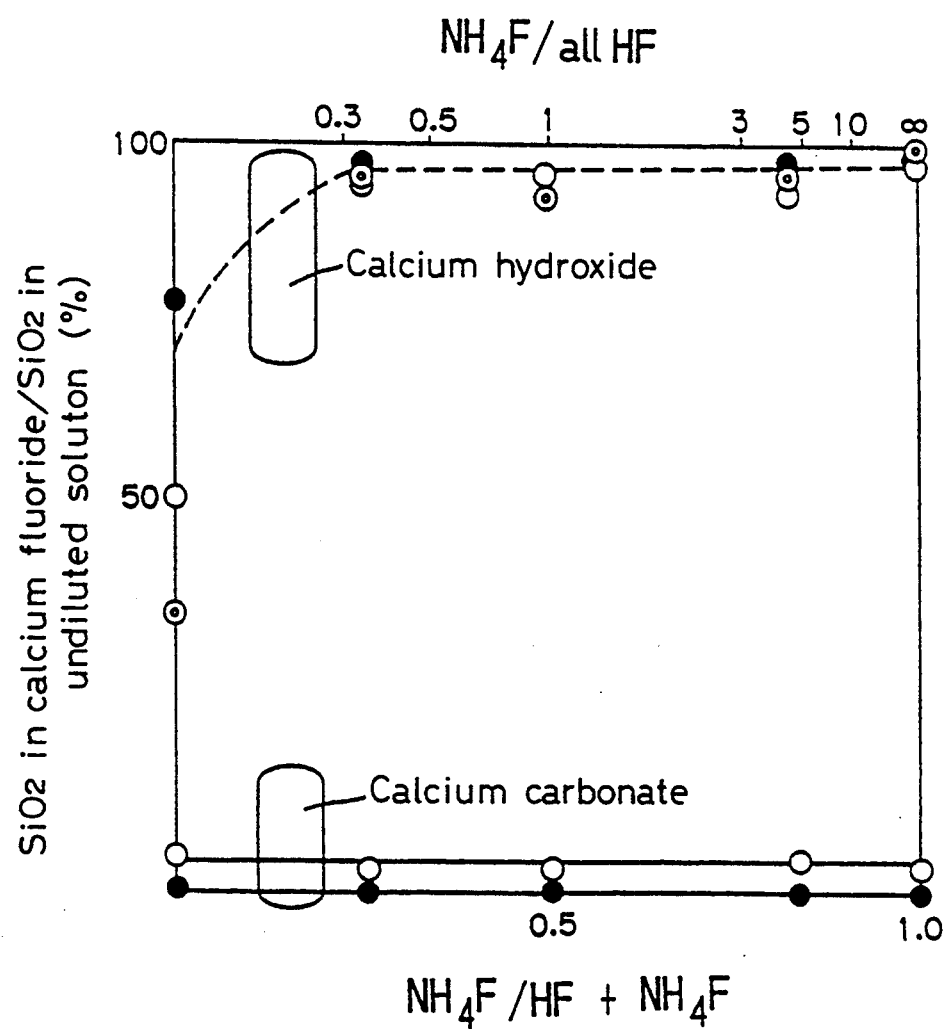
FIG. 6 is a graphic diagram showing deposition percentage of silica in the calcium fluoride produced in the reaction between the etchant of hydrogen fluoride or ammonium fluoride and calcium carbonate or calcium hydroxide.
Figure 7:
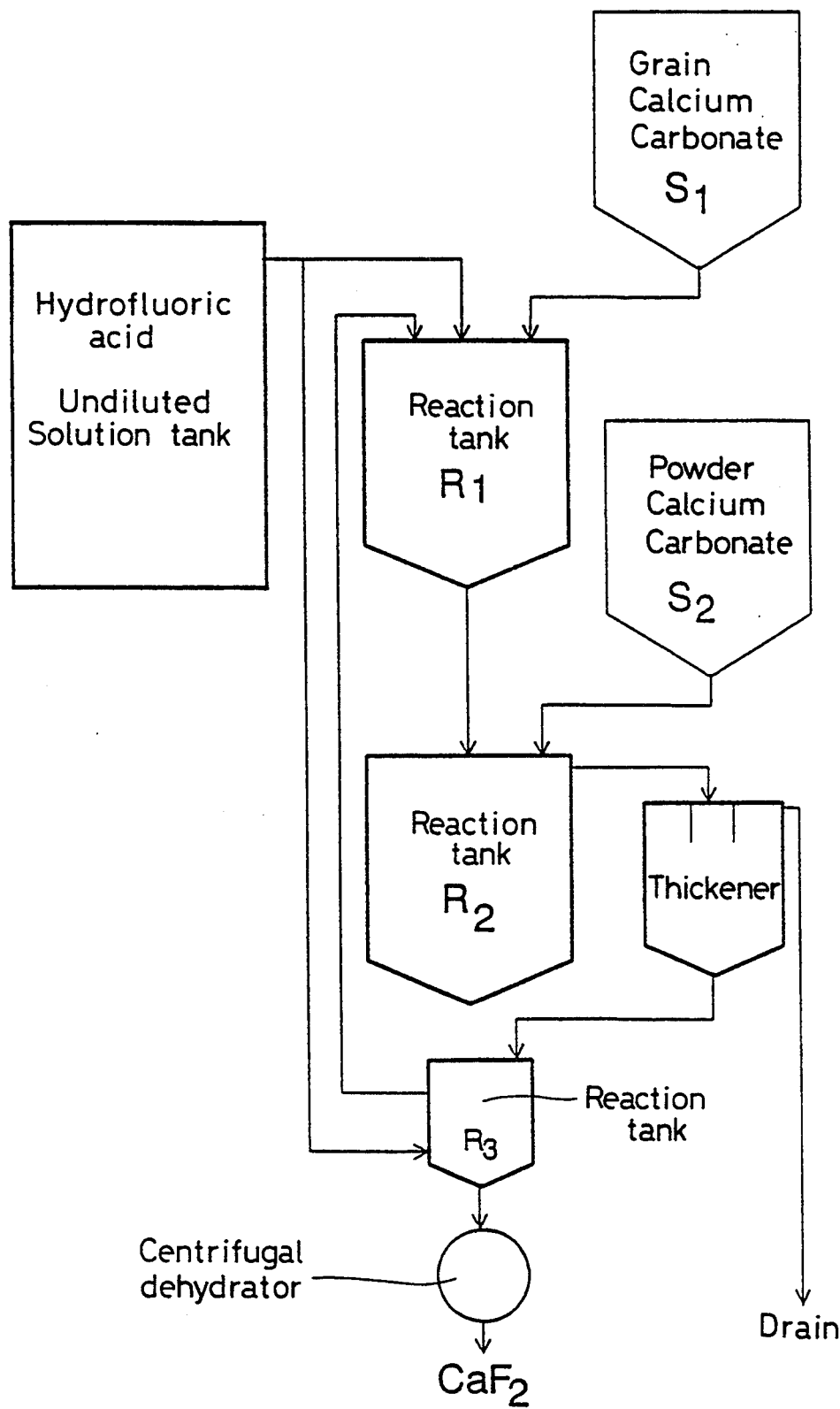
FIG. 7 is a flow sheet showing an example of treatment of the two component etchant of HF—$H_2O$.

Using the system in FIG. 7, a treatment of an etchant of hydrofluoric acid was carried out under normal temperature. 0.5% hydrofluoric acid was introduced into the reaction tank R1 (20 $M^3$ in capacity) at a flow rate of 2 t/h, to which granular calcium carbonate (0.05 to 0.15 in grain size) was added at the rate of 25 kg/h for a reaction taking 100 hours of residence time. Then powdered calcium carbonate (2000 to 6000 $cm^2/g$ in specific surface area) was added at a rate of 4 kg/h in the reaction tank R2 for a reaction taking 10 hours of residence time. A solution was introduced into a thickener to be separated into solid phase and liquid phase portions, and the solid phase was transferred into the reaction tank R3 and treated therein by the counterflow method. That is, the 0.5% hydrofluoric acid was supplied at a flow rate of 400 kg/h to the tank R3, and was integrated into the reaction tank R1 after transforming unreacted calcium carbonate to calcium fluoride. The concentration of fluorine contained in the drainage discharged out of the thickener was found to be not higher than 15 ppm. Table 1 shows the result. Capacity of each of the reaction tanks R1 and R2 was 20$M^3$. On the other hand, capacity of the reaction tank R3 was 2$M^3$ being reduced to 1/10 as compared with that of the tanks R1 and R2. Thus not less than 99% of calcium fluoride was recovered by the counter flow method.

EXAMPLE 2

Figure 8:
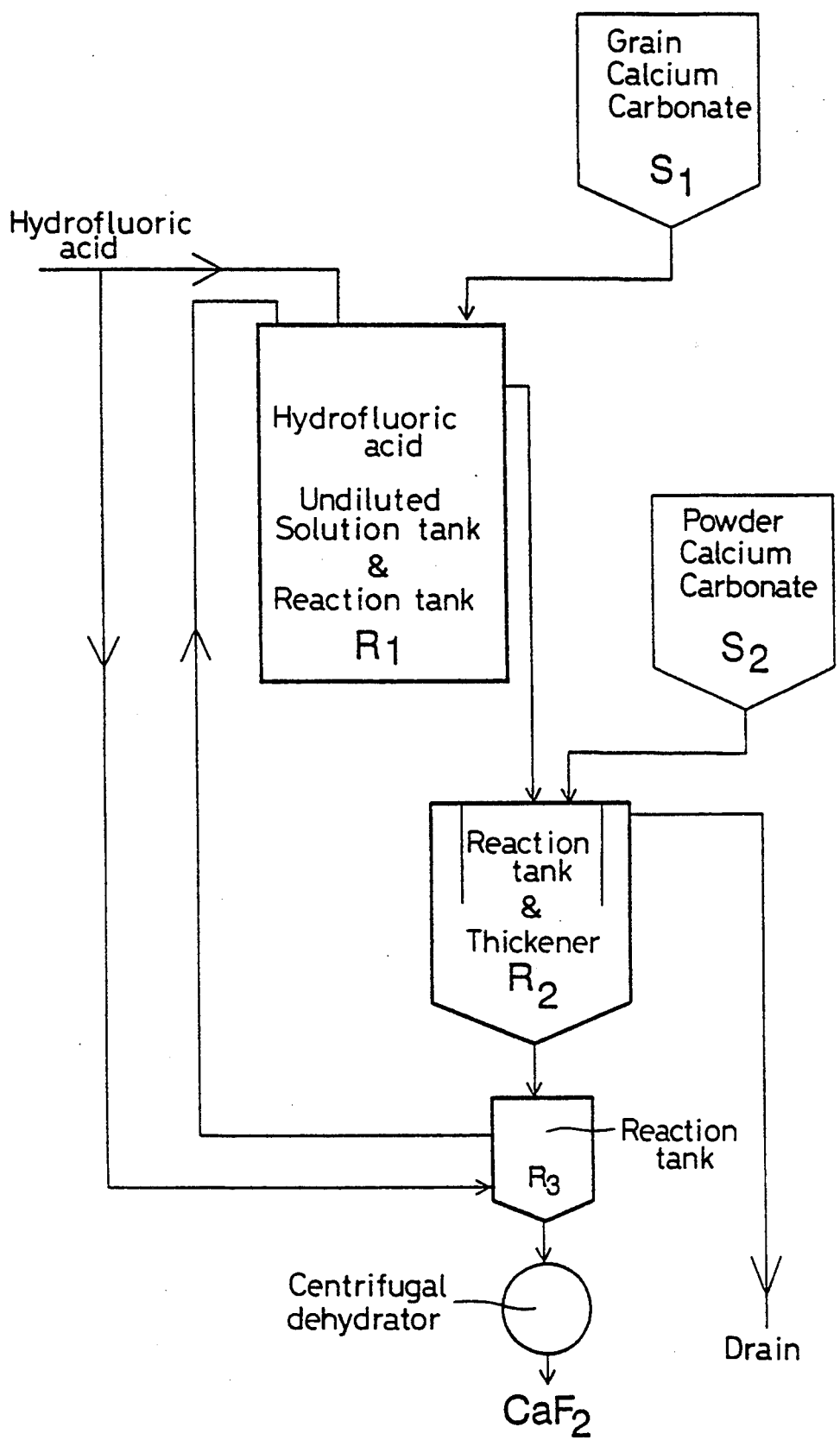
FIG. 8 is a flow sheet showing an example of treatment of the two component etchant of HF—$H_2O$.
Figure 11:
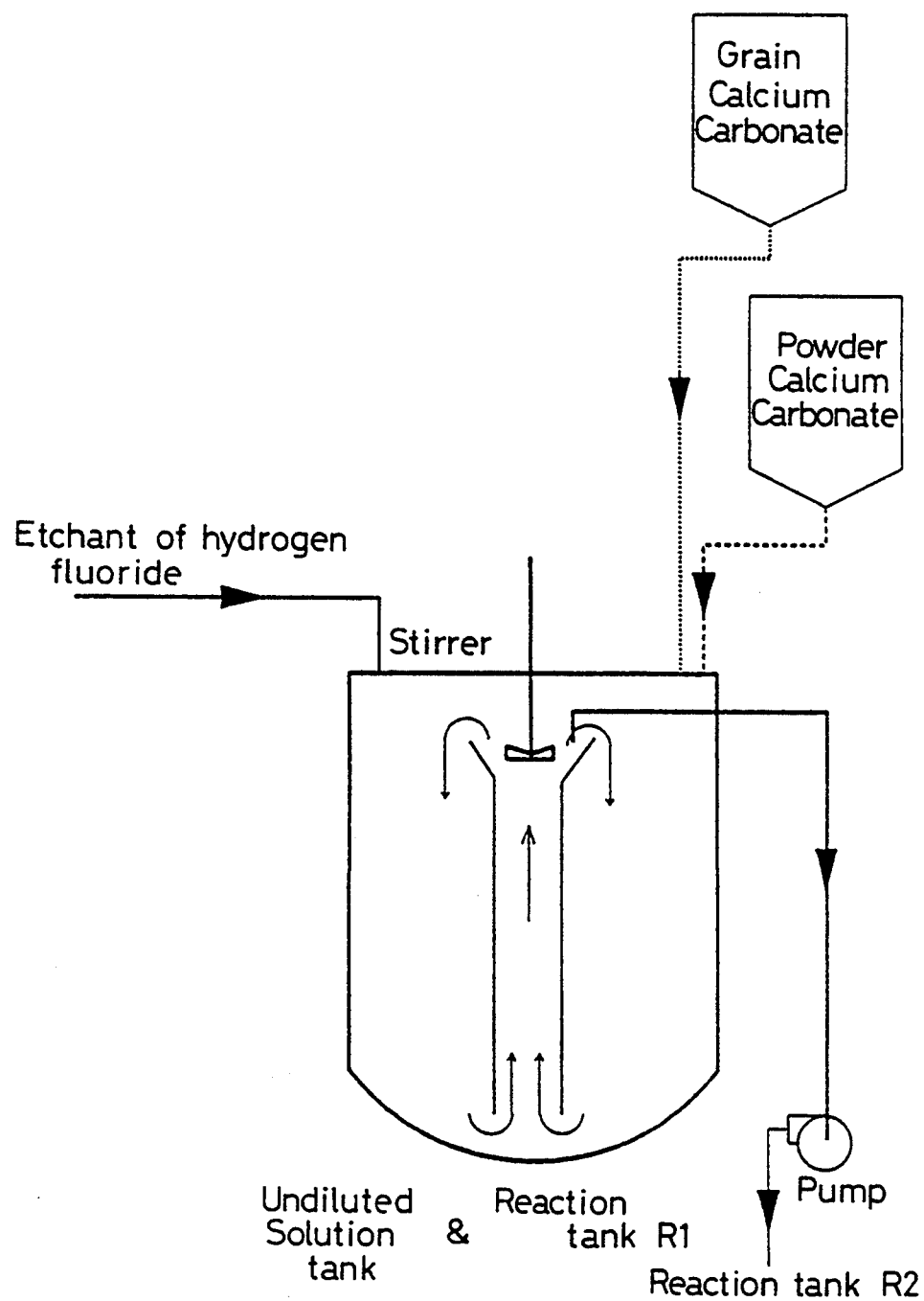
FIG. 11 is an explanatory diagram showing an example of stirring tank in the starting undiluted liquid tank.
Figure 12:
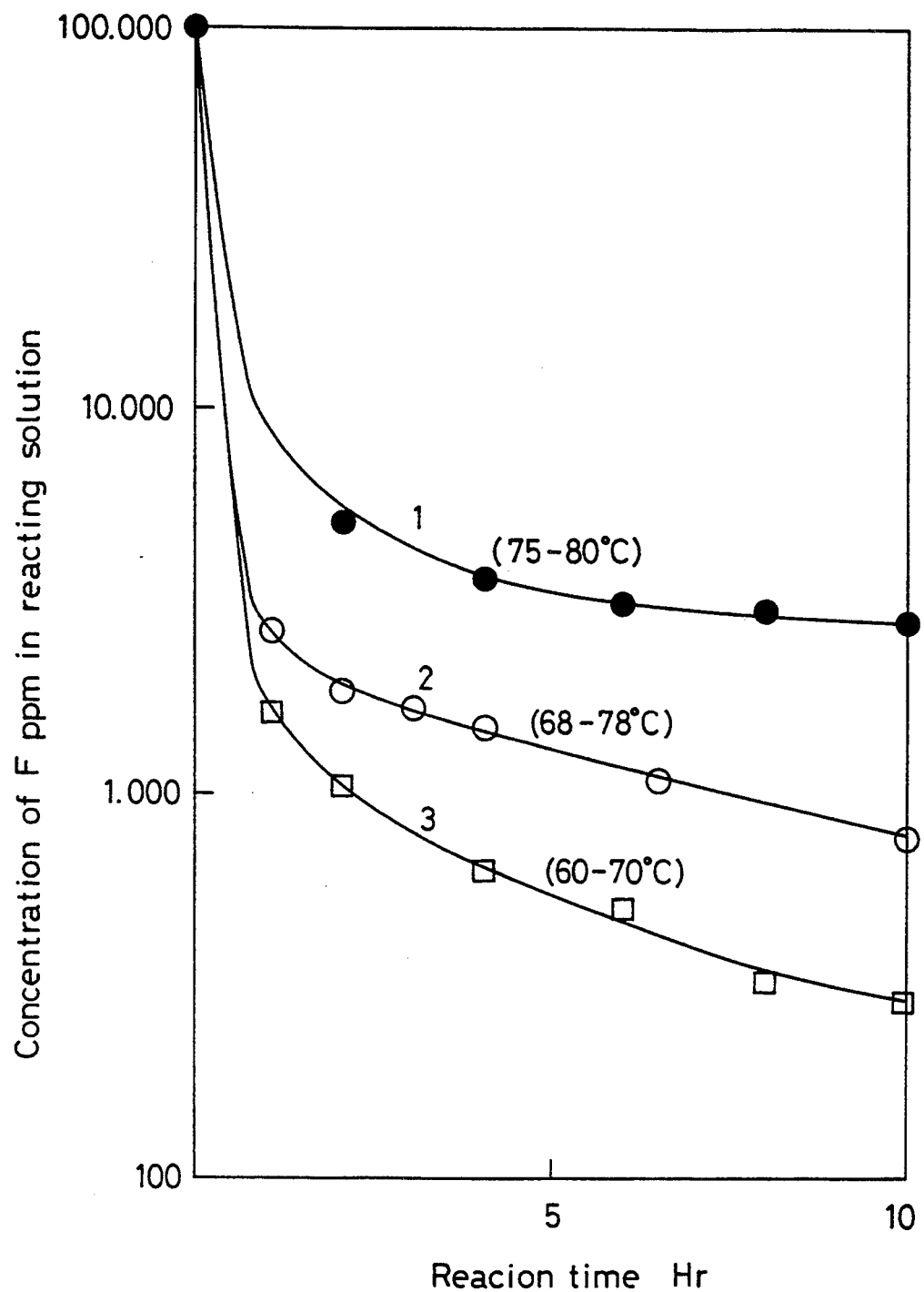
FIG. 12 is a graphic diagram showing the conditions of temperature, aeration and deaeration in the approximate chemical equivalent reaction between a solution containing ammonium fluoride and calcium carbonate, and showing the relation between such conditions and the rate of reduction of the concentration of fluorine in the reacting solution.
Figure 13:
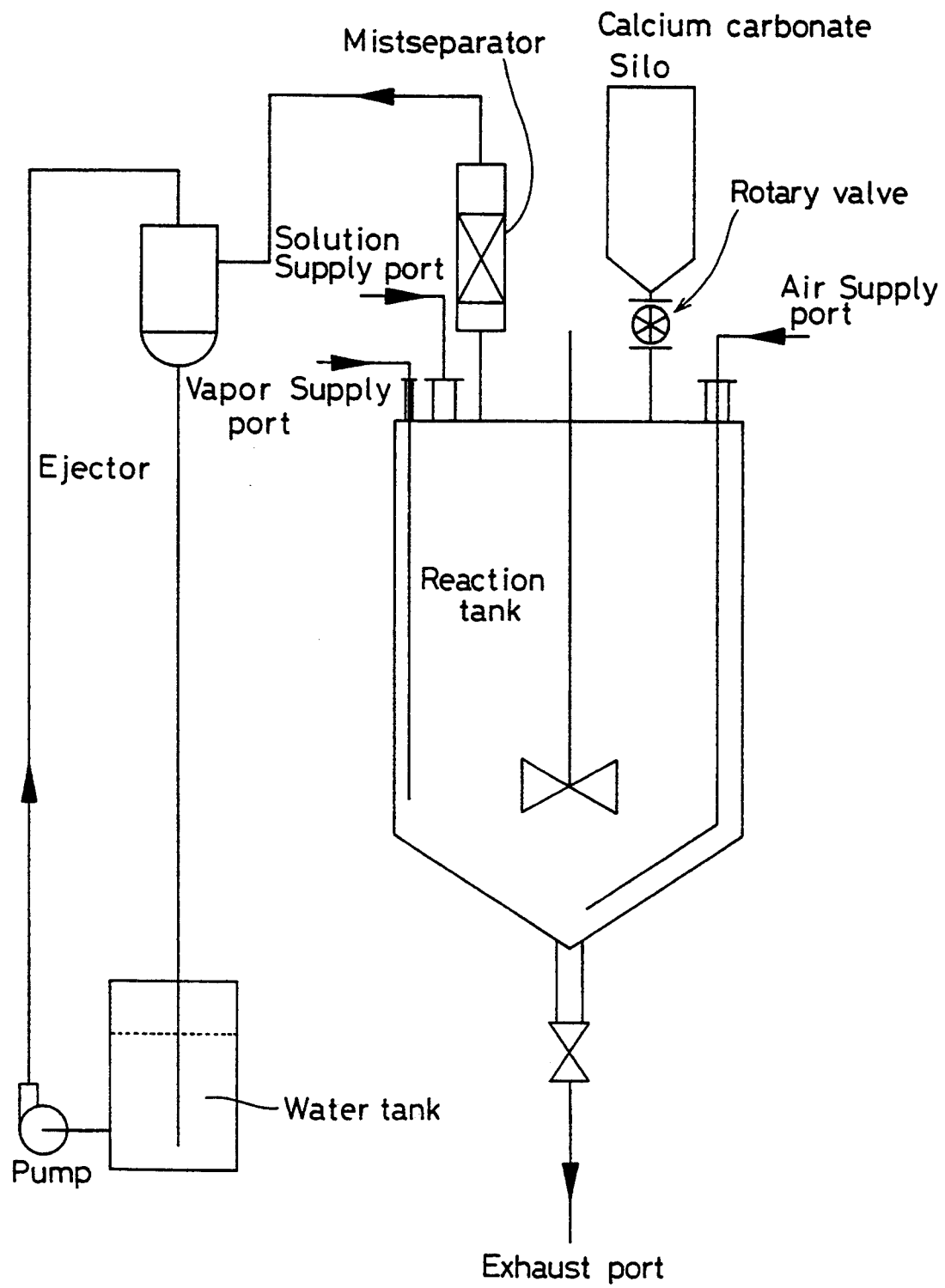
FIG. 13 is an explanatory diagram showing an example of recovery system of calcium fluoride.

Using the system in FIG. 8, treatment of an etchant of hydrofluoric acid was carried out under normal temperature. Granular calcium carbonate was added at the rate of 25 kg/h to the starting undiluted liquid tank R1 of 50$M^3$ into which 0.5% hydrofluoric acid was introduced at an addition rate of 2 t/h. The undiluted solution tank is provided with a stirring mechanism where a mixture in a state of solid and liquid phases was kept for the residence time of 24 hours, then introduced into the reaction tank R2 continuously in a state of slurry. FIG. 11 shows an example of such stirring mechanism in the undiluted solution tank. Powdered calcium carbonate was added to the reaction tank R2 at an addition rate of 4 kg/h for a reaction. Separation into solid and liquid phases was performed by the thickener, and the solid phase part was placed in the reaction tank R3 and treated by counterflow in the same manner as Example 1. That is, 0.5% hydrofluoric acid was supplied at a flow rate of 400 kg/h to the tank R3 for the counterflow treatment, and was integrated into the reaction tank R1 after transforming unreacted calcium carbonate to calcium fluoride. Table 1 shows the result.

EXAMPLE 3

Figure 9:
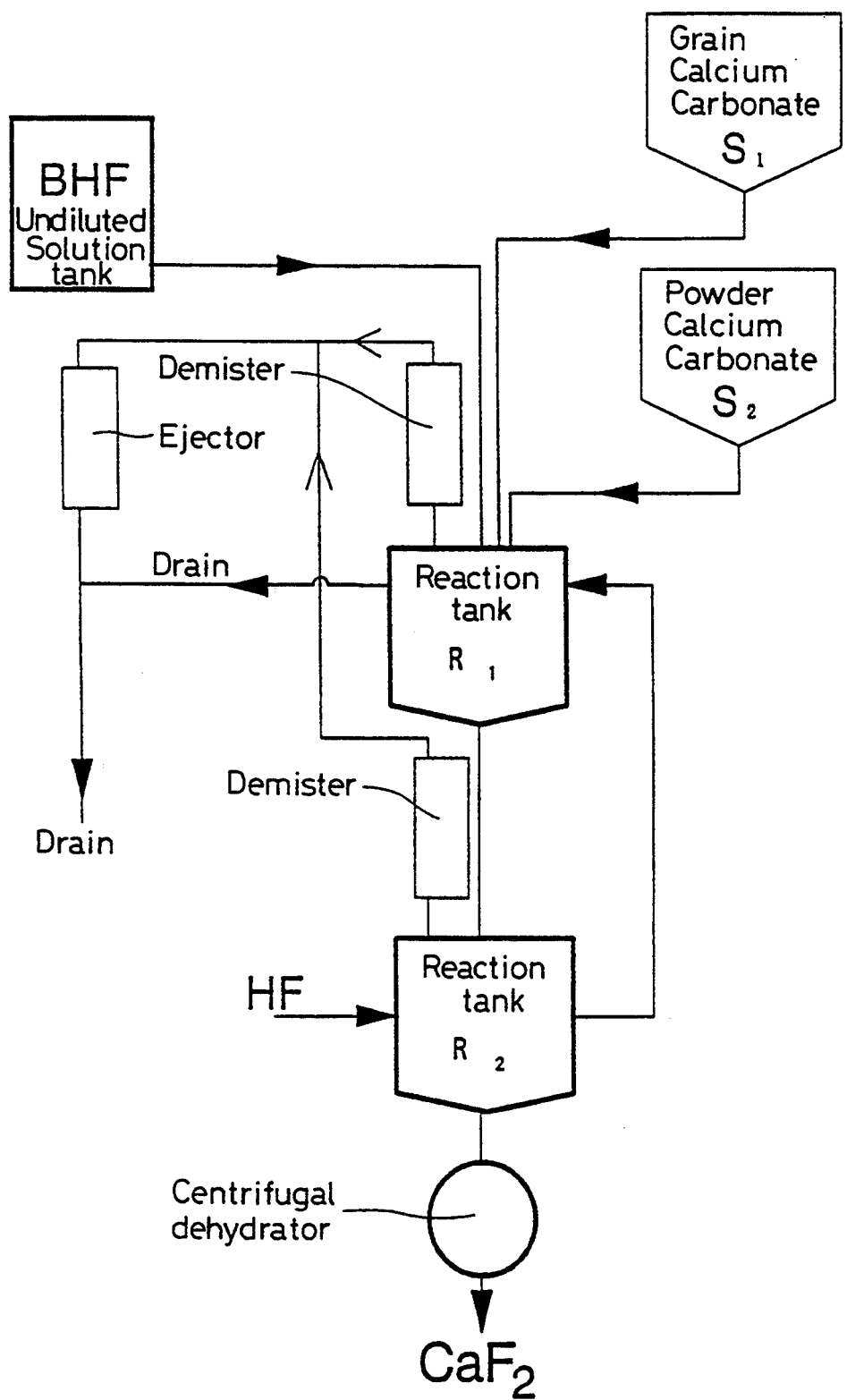
FIG. 9 is a flow sheet showing an example of treatment of the three component etchant of HF—$NH_4F$—$H_2O$.

Using the system in FIG. 9, an etchant of hydrogen fluoride and ammonium fluoride (10000 ppm in content of fluorine) was introduced into the reaction tank R1. First, an approximate equivalent of granular calcium carbonate was added at 70° C. to be reacted for 10 hours, then an approximate equivalent of powdered calcium carbonate was added to the residual fluorine for a reaction of 10 hours thereby removing not less than 99% of fluorine from the etchant. Separation into solid and liquid phases was performed, and the solid phase part was placed in the reaction tank R2 and reacted with an etchant of HF5% hydrofluoric acid by counterflow to transform unreacted calcium carbonate to calcium fluoride. Thus, not less than 99% of calcium fluoride was recovered. Table 2 shows the result.

EXAMPLE 4

Figure 10:
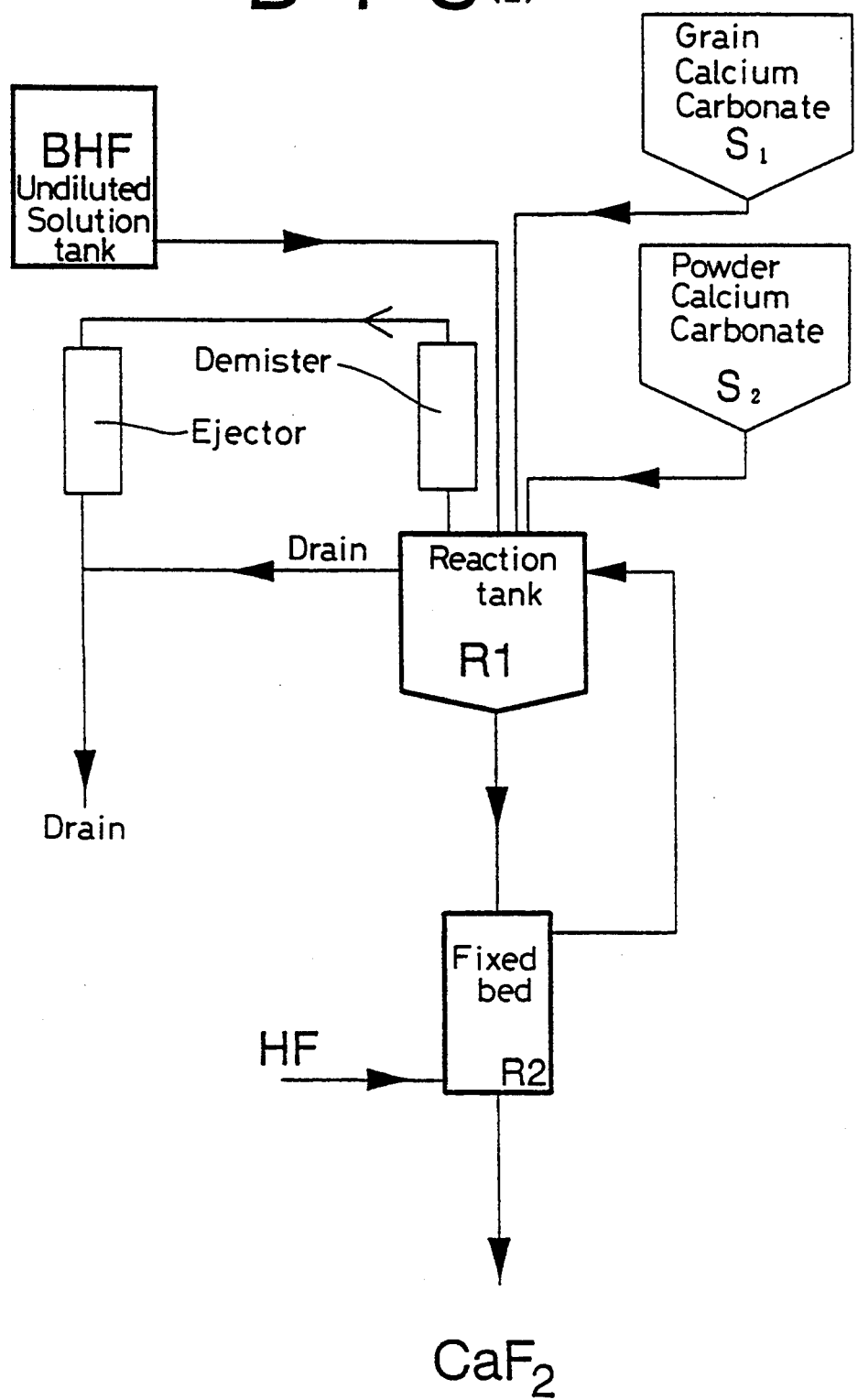
FIG. 10 is a flow sheet showing an example of treatment of the three component etchant of HF—$NH_4F$—$H_2O$.

Using the system in FIG. 10, an etchant of hydrogen fluoride and ammonium fluoride (10000 ppm in content of fluorine) was introduced into the reaction tank R1. First, an approximate equivalent of granular calcium carbonate was added at 70° C. to be reacted for 10 hours, then an approximate equivalent of powder calcium carbonate was added to the residual fluorine for a reaction of 10 hours thereby removing not less than 99% of fluorine from the etchant. Separation into solid and liquid phases was performed, and a fixed bed R2 was filled with the solid phase part, and treated with 5% hydrofluoric acid by counterflow. That is, after transforming unreacted calcium carbonate to calcium fluoride by supplying and reacting with an etchant of HF5% hydrofluoric acid by counterflow, the solution was integrated into the tank R1. Table 2 shows the result.

The mentioned treatment can be applied in the same manner to the drainage in which composition various etching assistants are blended with the etchant of hydrogen fluoride and ammonium fluoride. That is, the system shown in FIG. 7 or 8 was used at normal temperature with respect to the drainage of hydrogen fluoride alone while the system shown in FIG. 9 or 10 was used at 70° C. with respect to the drainage of hydrogen fluoride and ammonium fluoride, for reactions with calcium carbonate separately performed in two stages. Separation into solid and liquid phases was performed, and the liquid phase was discharged as drainage, while the solid phase was reacted with an etchant of HF5% hydrofluoric acid by counterflow. Thus, not less than 99% of calcium fluoride was recovered. Tables 3 and 4 show the result.

It is to be noted that in every example described above almost no silica was recovered in the calcium fluoride.

EXAMPLE 6

200 liters of solution composed of 15.35% $NH_4F$ and HF 1.70% and 51.1 kgs of pure calcium carbonate component (200 $cm^2/g$ in specific surface area were introduced into a stirring type reaction tank of 250 liters in capacity. Then, air was supplied at a rate of 50 liters/min keeping the solution temperature at 70° C. After 15 hours, pH of the treatment solution was 8.0, and concentration of fluorine was 95 ppm.

EXAMPLE 7

The same solution as the foregoing Example 1 and calcium carbonate were introduced into a stirring type pressure proof reaction tank of 250 liters in capacity. Then, pressure in the reaction tank was kept at a reduced pressure of 100 to 200 mmHg by means of an ejector keeping the solution temperature at 60° C. After 15 hours, pH of the treatment solution was 7.0, and concentration of fluorine was 13 ppm. Concentration of fluorine of the solution collected by the ejector was found to be not less than 1 ppm.

COMPARATIVE EXAMPLE

The same solution as the foregoing Example 1 and calcium carbonate were introduced into the same reaction tank. Then, a reaction took place by stirring alone without carrying out aeration and deaeration by reduced pressure keeping the solution temperature at 80° C. After 15 hours, pH of the treatment solution was 9.0 and concentration of fluorine was 337 ppm.

TABLE 1

| | Undiluted treatment solution | | R2 out | | R3 out Composition of recovered $CaF_2$ | | |
|---|---|---|---|---|---|---|---|
| | HF (%) | $SiO_2$ (%) | Fluorine concentration in drain (ppm) | $CaCO_3$ in solid phase (%) | $CaF_2$ (%) | $CaCO_3$ (%) | $SiO_2$ (%) |
| Example 1 | 0.5 | 0.02 | 10 | 8.8 | 99.0 | 0.59 | 0.07 |
| Example 2 | 0.5 | 0.2 | 11 | 8.5 | 99.1 | 0.60 | 0.60 |

TABLE 2

| | Undiluted treatment solution | | | R2 out | | R3 out Composition of recovered $CaF_2$ | | |
|---|---|---|---|---|---|---|---|---|
| | HF (%) | $NH_4F$ (%) | $SiO_2$ (%) | Fluorine concentration in drain (ppm) | $CaCO_3$ in solid phase (%) | $CaF_2$ (%) | $CaCO_3$ (%) | $SiO_2$ (%) |
| Example 3 | 1.70 | 15.35 | 0.04 | 11 | 2.5 | 99.2 | 0.55 | 0.08 |
| Example 4 | 1.70 | 15.35 | 0.04 | 10 | 2.6 | 99.3 | 0.54 | 0.07 |

TABLE 3

| | Undiluted treatment solution | | | R2 out | | R3 out Composition of recovered $CaF_2$ | | |
|---|---|---|---|---|---|---|---|---|
| | HF (%) | $SiO_2$ (%) | Assistant (%) | Fluorine concentration in drain (ppm) | $CaCO_3$ in solid phase (%) | $CaF_2$ (%) | $CaCO_3$ (%) | $SiO_2$ (%) |
| 1 | 0.5 | 0.02 | $H_2O_2$ 10.0 | 10 | 8.4 | 99.2 | 0.56 | 0.06 |
| 2 | 1.70 | 15.35 | $HNO_3$ 0.04 | 11 | 8.5 | 99.3 | 0.61 | 0.05 |

TABLE 4

| Undiluted | R2 out | R3 out |
|---|---|---|

TABLE 4-continued

| RUN | treatment solution | | | | Fluorine concentration in drain (ppm) | CaCO₃ in solid phase (%) | Composition of recovered CaF₂ | | |
|---|---|---|---|---|---|---|---|---|---|
| | HF (%) | NH₄F (%) | SiO₂ (%) | Assistant (%) | | | CaF₂ (%) | CaCO₃ (%) | SiO₂ (%) |
| 3 | 0.18 | 2.86 | 0.03 | Acetic acid 2.5 | 10.0 | 2.6 | 99.1 | 0.75 | 0.03 |
| 4 | 1.70 | 15.35 | 0.03 | Surfactant 200 ppm | 11 | 2.5 | 99.4 | 0.55 | 0.04 |

What is claimed is:

1. A process for recovering fluorine in a form of calcium fluoride essentially free of silica component from an etchant containing a silica component and composed mainly of hydrogen fluoride or hydrogen fluoride and ammonium fluoride, comprising the step of reacting the etchant with calcium carbonate at a temperature not lower than 50° C. within a composition region in which the mole equivalent ratio for ammonium fluoride/hydrogen fluoride is not more than 1.0, as a result of which calcium fluoride of high purity and essentially free of silica content is obtained having not more than about 3% of unreacted calcium carbonate.

2. A process for recovering calcium fluoride according to claim 1, wherein said etchant contains at least one etching aid selected from the group consisting of nitric acid, hydrochloric acid, acetic acid, hydrogen peroxide, and surfactants.

3. A process for recovering fluorine in a form of calcium fluoride essentially free of silica component from an etchant containing a silica component and composed mainly of hydrogen fluoride or hydrogen fluoride and ammonium fluoride, comprising reacting said etchant with calcium carbonate, wherein the direction of transfer of said etchant is in counterflow to the direction of transfer of calcium carbonate and calcium fluoride formed by reaction between the added calcium carbonate and the etchant, as a result of which calcium fluoride of high purity and essentially free of silica content is obtained having not more than about 3% of unreacted calcium carbonate.

4. A process for recovering calcium fluoride according to claim 3, wherein said etchant contains at least one etching aid selected from the group consisting of nitric acid, hydrochloric acid, acetic acid, hydrogen peroxide, and surfactants.

5. A process for recovering not less than 99% of fluorine in a form of calcium fluoride essentially free of silica component from an etchant containing a silica component and composed mainly of hydrogen fluoride or hydrogen fluoride and ammonium fluoride, comprising adding an approximate equivalent amount of calcium carbonate for reaction with the etchant in the following manner:

(1) in one stage of said process the transfer direction of etchant is in the same direction as the transfer direction of calcium carbonate and produced calcium fluoride; and (2) in another stage of said process the transfer direction of etchant is in counterflow to the transfer direction of calcium carbonate and produced calcium fluoride, as a result of which calcium fluoride essentially free of silica component is obtained having not more than about 1% of unreacted calcium carbonate.

6. A process for recovering calcium fluoride according to claim 5, comprising:

(1) a step for producing granular calcium fluoride containing calcium carbonate by adding to at least a portion of the etchant granular calcium carbonate in an amount equivalent to fluorine dissolved in the etchant;

(2) a step of adding powdered calcium carbonate to the treated solution resulting from step (1), said powdered calcium carbonate being in an amount equivalent to fluorine remaining in the treated solution;

(3) a step of performing solid-liquid separation of products produced in step (2) and draining the separated liquid;

(4) a step of bringing the solid separated in step (3) into contact with at least a portion of etchant, as a result of which calcium carbonate remaining in the granular calcium fluoride produced in the step (1) is transformed into calcium fluoride;

(5) a step of performing solid-liquid separation of products produced in step (4), and recovering the separated solid while supplying the separated liquid back to said step (1).

7. A process for recovering calcium fluoride according to claim 6, wherein said etchant contains at least one etching aid selected from the group consisting of nitric acid, hydrochloric acid, acetic acid, hydrogen peroxide, and surfactants.

8. A process for recovering calcium fluoride according to claim 5, comprising (1) a step of supplying an etchant containing ammonium fluoride to a first reaction stage for reaction with calcium carbonate at a temperature of not lower than 50° C. and preferably under a reduced pressure of 350 mmHg;

(2) a step of performing a solid-liquid separation after step (1) and draining the separated liquid;

(3) a step of supplying the solid separated in step (2) to a second reaction stage for reaction with an etchant containing hydrogen fluoride to transform residual calcium carbonate into calcium fluoride;

(4) a step of performing a solid-liquid separation after step (3), and recovering the separated solid while supplying the separated liquid back to said first reaction stage.

9. A process for recovering calcium fluoride according to claim 8, wherein said etchant contains at least one etching aid selected from the group consisting of nitric acid, hydrochloric acid, acetic acid, hydrogen peroxide, and surfactants.

10. A process for recovering calcium fluoride according to claim 5, wherein said one stage is a first stage and said other stage is a second stage following said first stage, the transfer direction of etchant and the transfer direction of calcium carbonate in the first stage are in the same direction, whereas the transfer direction of etchant in the second stage is in counterflow to the transfer direction of calcium carbonate and produced calcium fluoride, said second stage comprising a fixed bed which is filled with calcium fluoride produced in the first stage, and the etchant added in said second stage is composed mainly of hydrogen fluoride.

11. A process for recovering calcium fluoride according to claim 10, wherein said etchant contains at least one etching aid selected from the group consisting of nitric acid, hydrochloric acid, acetic acid, hydrogen peroxide, and surfactants.

12. A process for recovering calcium fluoride according to claim 5, wherein said etchant contains at least one etching aid selected from the group consisting of nitric acid, hydrochloric acid, acetic acid, hydrogen peroxide, and surfactants.

* * * * *